(12) United States Patent
Xu et al.

(10) Patent No.: US 10,979,890 B2
(45) Date of Patent: Apr. 13, 2021

(54) POLICY CONTROL FRAMEWORK

(71) Applicant: iBasis, Inc., Lexington, MA (US)

(72) Inventors: Richard H. Xu, Wakefield, MA (US); Hwan Jang Tang, Concord, MA (US); Yixin Fan, Westford, MA (US); Vitaliy G. Yurchenko, Framingham, MA (US)

(73) Assignee: iBasis, Inc., Lexington, MA (US)

( * ) Notice: Subject to any disclaimer, the term of this patent is extended or adjusted under 35 U.S.C. 154(b) by 307 days.

(21) Appl. No.: 15/260,897

(22) Filed: Sep. 9, 2016

(65) Prior Publication Data

US 2018/0077564 A1 Mar. 15, 2018

(51) Int. Cl.
*H04W 4/00* (2018.01)
*H04W 8/20* (2009.01)
*H04W 8/18* (2009.01)
*H04W 8/02* (2009.01)
(Continued)

(52) U.S. Cl.
CPC ............ *H04W 8/205* (2013.01); *H04W 8/02* (2013.01); *H04W 8/18* (2013.01); *H04W 24/08* (2013.01); *H04W 48/04* (2013.01)

(58) Field of Classification Search
CPC ......... H04W 8/18; H04W 48/16; H04W 8/12; H04W 48/18
See application file for complete search history.

(56) References Cited

U.S. PATENT DOCUMENTS

| 5,940,512 A | 8/1999 | Tomoike |
| 6,085,084 A | 7/2000 | Christmas |
| 6,157,636 A | 12/2000 | Voit et al. |

(Continued)

FOREIGN PATENT DOCUMENTS

| EP | 2 530 884 A1 | 12/2012 |
| EP | 2 675 111 A1 | 12/2013 |

(Continued)

OTHER PUBLICATIONS

Barriga et al., "M2M Remote-Subscription Management," Ericsson Review, 6 pages (2011).

(Continued)

*Primary Examiner* — Shantell L Heiber
(74) *Attorney, Agent, or Firm* — Hamilton, Brook, Smith & Reynolds, P.C.

(57) ABSTRACT

A method and corresponding apparatus performing roaming traffic detection and enforcement according to a roaming policy. At least one example embodiment includes a user network device roaming in a visited communications network, and being subscribed to a home communications network. The example embodiment further includes an interconnect network communicatively coupling the visited communications network and the home communications network, the interconnect network comprises a roaming policy database configured to store an identifier associated with the user network device, and a roaming policy for the user network device, and a traffic detection and enforcement module. According to some embodiments, the traffic detection and enforcement module may be configured to identify a data request being sent from the user network device in the visited mobile network by reading the identifier in the data request, and deny or allow the data request based on the roaming policy.

40 Claims, 8 Drawing Sheets

(51) Int. Cl.
    *H04W 24/08*    (2009.01)
    *H04W 48/04*    (2009.01)

(56)            References Cited

U.S. PATENT DOCUMENTS

| | | | |
|---|---|---|---|
| 6,658,458 | B1 | 12/2003 | Gai |
| 6,735,190 | B1 | 5/2004 | Chuah |
| 6,788,647 | B1 | 9/2004 | Mohaban et al. |
| 6,810,250 | B2 * | 10/2004 | Jo .................... H04W 8/12 |
| | | | 455/432.1 |
| 6,839,340 | B1 | 1/2005 | Voit |
| 7,184,764 | B2 | 2/2007 | Raviv et al. |
| 7,738,465 | B2 | 6/2010 | Akahane et al. |
| 8,095,124 | B2 | 1/2012 | Balia |
| 8,478,238 | B2 | 7/2013 | Mohammed et al. |
| 8,537,695 | B2 | 9/2013 | Wiley et al. |
| 8,593,958 | B2 | 11/2013 | Zhang |
| 8,751,647 | B1 | 6/2014 | Yip et al. |
| 8,811,969 | B2 | 8/2014 | Shi et al. |
| 8,671,204 | B2 | 11/2014 | Srinivasan |
| 8,948,750 | B1 * | 2/2015 | Carames ............ H04W 8/12 |
| | | | 455/433 |
| 9,060,263 | B1 | 6/2015 | Carames et al. |
| 9,084,081 | B2 * | 7/2015 | Gupta .................. H04W 76/10 |
| 9,104,643 | B2 | 8/2015 | DeCusatis |
| 9,137,140 | B2 | 9/2015 | Tao |
| 9,179,316 | B2 | 11/2015 | Raleigh |
| 9,198,022 | B1 * | 11/2015 | Draznin .............. H04L 61/1588 |
| 9,198,074 | B2 | 11/2015 | Raleigh et al. |
| 9,247,424 | B2 | 1/2016 | Haggerty et al. |
| 9,288,750 | B2 | 3/2016 | Tuli et al. |
| 9,319,223 | B2 | 4/2016 | Nix |
| 9,374,700 | B2 | 6/2016 | Trapp |
| 9,451,098 | B2 | 9/2016 | Zhu et al. |
| 9,555,332 | B2 | 1/2017 | Emura |
| 9,629,018 | B2 | 4/2017 | Xu |
| 9,674,880 | B1 | 6/2017 | Egner et al. |
| 9,781,229 | B2 * | 10/2017 | Srinivas .............. G06F 9/4451 |
| 10,045,260 | B2 | 8/2018 | Li et al. |
| 10,070,288 | B2 | 9/2018 | Yu |
| 10,263,903 | B2 | 4/2019 | Xu |
| 10,524,116 | B2 | 12/2019 | Xu et al. |
| 10,820,190 | B2 | 10/2020 | Xu |
| 2002/0068578 | A1 * | 6/2002 | Agarwal ............. H04W 4/16 |
| | | | 455/455 |
| 2002/0080819 | A1 | 6/2002 | Tsao |
| 2004/0162058 | A1 | 8/2004 | Mottes |
| 2005/0152275 | A1 | 7/2005 | Laurila et al. |
| 2006/0187942 | A1 | 8/2006 | Mizutani |
| 2008/0049621 | A1 | 2/2008 | McGuire |
| 2008/0125114 | A1 | 5/2008 | Dorenbosch |
| 2009/0116398 | A1 | 5/2009 | Shi et al. |
| 2010/0158009 | A1 | 6/2010 | Lee |
| 2010/0191846 | A1 * | 7/2010 | Raleigh ............ G06Q 10/06375 |
| | | | 709/224 |
| 2010/0311402 | A1 | 12/2010 | Srinivasan et al. |
| 2011/0235595 | A1 | 9/2011 | Mehta et al. |
| 2011/0275344 | A1 | 11/2011 | Momtahan et al. |
| 2011/0310734 | A1 | 12/2011 | Mizukoshi |
| 2012/0034916 | A1 | 2/2012 | Hu et al. |
| 2012/0041965 | A1 | 2/2012 | Vasquez et al. |
| 2012/0198061 | A1 | 2/2012 | Stenfelt et al. |
| 2012/0108205 | A1 | 5/2012 | Schell et al. |
| 2012/0108206 | A1 | 5/2012 | Haggerty |
| 2012/0108295 | A1 | 5/2012 | Schell et al. |
| 2012/0275442 | A1 | 11/2012 | Malets et al. |
| 2012/0282924 | A1 | 11/2012 | Tagg et al. |
| 2013/0029637 | A1 | 1/2013 | Hillier |
| 2013/0031191 | A1 | 1/2013 | Bott |
| 2013/0035136 | A1 | 2/2013 | Pison et al. |
| 2013/0054761 | A1 | 2/2013 | Kempf et al. |
| 2013/0064079 | A1 | 3/2013 | Zhang |
| 2013/0100819 | A1 | 4/2013 | Anchan et al. |
| 2013/0114615 | A1 | 5/2013 | Suemitsu et al. |
| 2013/0132854 | A1 | 5/2013 | Raleigh et al. |
| 2013/0142073 | A1 | 6/2013 | Shikitani |
| 2013/0157673 | A1 | 6/2013 | Brusilovsky |
| 2013/0195457 | A1 | 8/2013 | Levy et al. |
| 2013/0227646 | A1 | 8/2013 | Haggerty et al. |
| 2013/0230047 | A1 | 9/2013 | Subrahmaniam et al. |
| 2014/0004827 | A1 | 1/2014 | O'Leary |
| 2014/0024361 | A1 | 1/2014 | Poon et al. |
| 2014/0105119 | A1 | 4/2014 | Gupta et al. |
| 2014/0140507 | A1 | 5/2014 | Park et al. |
| 2014/0169286 | A1 | 6/2014 | Xu et al. |
| 2014/0199961 | A1 | 7/2014 | Mohammed et al. |
| 2014/0199962 | A1 | 7/2014 | Mohammed et al. |
| 2014/0226628 | A1 | 8/2014 | Helbert |
| 2014/0233399 | A1 | 8/2014 | Mann et al. |
| 2014/0235210 | A1 | 8/2014 | Park et al. |
| 2014/0259012 | A1 | 9/2014 | Nandlall et al. |
| 2014/0270764 | A1 | 9/2014 | DeCusatis et al. |
| 2014/0301203 | A1 | 10/2014 | Kampmann |
| 2014/0301397 | A1 | 10/2014 | Zhou |
| 2014/0329502 | A1 | 11/2014 | Lee et al. |
| 2014/0357219 | A1 * | 12/2014 | Nicolaescu ....... H04M 15/8038 |
| | | | 455/406 |
| 2014/0380470 | A1 | 12/2014 | Taniuchi et al. |
| 2015/0032890 | A1 | 1/2015 | Bott |
| 2015/0065125 | A1 * | 3/2015 | Patel .................. H04W 8/12 |
| | | | 455/433 |
| 2015/0081421 | A1 | 3/2015 | Moseman et al. |
| 2015/0163731 | A1 * | 6/2015 | Kotecha ............. H04W 12/08 |
| | | | 455/432.1 |
| 2015/0222554 | A1 | 8/2015 | Xu |
| 2015/0223104 | A1 | 8/2015 | Xu |
| 2015/0341791 | A1 | 11/2015 | Yang et al. |
| 2015/0349825 | A1 | 12/2015 | Lee et al. |
| 2015/0350880 | A1 | 12/2015 | Li et al. |
| 2015/0358757 | A1 | 12/2015 | Ford |
| 2015/0373530 | A1 | 12/2015 | Stein |
| 2016/0020802 | A1 | 1/2016 | Lee et al. |
| 2016/0021529 | A1 | 1/2016 | Park et al. |
| 2016/0037435 | A1 | 2/2016 | Yu |
| 2016/0050557 | A1 | 2/2016 | Park et al. |
| 2016/0080932 | A1 | 3/2016 | Jin et al. |
| 2016/0088456 | A1 | 3/2016 | Ramprasad et al. |
| 2016/0142855 | A1 | 5/2016 | Yu |
| 2016/0183095 | A1 | 6/2016 | Huber et al. |
| 2016/0192179 | A1 | 6/2016 | Huber |
| 2016/0198378 | A1 | 7/2016 | Huber |
| 2016/0242033 | A1 | 8/2016 | Jung et al. |
| 2016/0286377 | A1 | 9/2016 | Stein et al. |
| 2016/0295544 | A1 | 10/2016 | Jiang et al. |
| 2016/0316372 | A1 | 10/2016 | Daksiewicz et al. |
| 2016/0381699 | A1 | 12/2016 | Rubin et al. |
| 2017/0048713 | A1 | 2/2017 | Guday et al. |
| 2017/0070424 | A1 | 3/2017 | Xiao |
| 2017/0289283 | A1 | 5/2017 | Ungerer et al. |
| 2017/0230820 | A1 | 8/2017 | Ho et al. |
| 2017/0332421 | A1 | 11/2017 | Sternberg et al. |
| 2017/0374599 | A1 | 12/2017 | Carvalho |
| 2018/0160385 | A1 | 6/2018 | Chastain et al. |
| 2018/0160387 | A1 | 6/2018 | Chastain et al. |
| 2018/0376325 | A1 | 12/2018 | Xu et al. |
| 2020/0068388 | A1 | 2/2020 | Xu et al. |
| 2020/0084614 | A1 | 3/2020 | Xu |

FOREIGN PATENT DOCUMENTS

| | | |
|---|---|---|
| WO | WO 2007/047479 | 4/2007 |
| WO | 2007/092573 A2 | 8/2007 |
| WO | WO 2010/023645 | 3/2010 |
| WO | 2013/112642 A2 | 8/2013 |
| WO | 2015/119967 | 8/2015 |
| WO | WO 2015/119965 | 8/2015 |
| WO | WO 2015/119967 | 8/2015 |
| WO | 2016/145121 | 9/2016 |

OTHER PUBLICATIONS

Deutshe Telekom, "Global M2M Association eliminates borders," [Online], [Retrieved on Aug. 12, 2016], Retrieved from the Internet

(56) References Cited

OTHER PUBLICATIONS

URL: https://www.telekom.com/media/enterprise-solutions/267180, 3 pages (Feb. 18, 2015).
MVNO Dynamics, "Globetouch and UROS Launch Global eSIM Ecosystem to Deliver Secure, Cost-Efficient Roaming," Press Release, [Online], [Retrieved on Sep. 16, 2016], Retrieved from the Internet URL: https://www.mvnodynamics.com/2106/03/04/globeltouch-and-uros-launch . . . , 4 pages (Mar. 4, 2016).
GSM Association, "Remote Provisioning Architecture for Embedded UICC Test Specification," Version 3.1, 524 pages (May 31, 2016).
GSM Association, "SGP.22 CR1003 RSP Technical Specification," Change Request Form, 221 pages (Jul. 8, 2016).
Hong Kong Mobility Partner Program, "Simgo Launches eSIM 4G Hotspot," [Online] [Retrieved on Sep. 16, 2016], Retrieved from the Internet URL: https://www.applemobility.hk/2016/02/25/simgo-launches-esim-4h-hotspot/, 3 pages (2016).
MacKee et al., "Navigating the eSIM revolution as an MNO, Embedded SIM—a game changer in mobile telcom," Oslo, 19 pages (Feb. 4, 2016).
Meukel et al., "E-SIM for consumers—a game changer for mobile telecommunications?," McKinsey & Company, [Online], [Retrieved on Aug. 12, 2016], Retrieved from the Internet URL: https://www.mckinsey.com/industries/telecommunications/our-insights/ . . . , 12 pages (Jan. 2016).
Numerex, "5 Key Ingredients for a Robust, End-to-End IoT Platform," 8 pages [Online] [Retrieved on Jan. 20, 2017].
Vahidian, "Evolution of the SIM to eSIM," NTNU-Trondheim, Norwegian University of Science and Technology, Department of Telematics, 110 pages (Jan. 21, 2013).
GSM Association, "RSP Architecture," Version 2.1, 94 pages (Feb. 27, 2017).
GSM Association, "RSP Architecture," Version 2.0, 52 pages (Aug. 23, 2016).
Numerex Network Solutions, "Simplifying M2M Connectivity," 2 pages [Online] [Retrieved on Jan. 20, 2017].
GSM Association, "RSP Technical Specification," Version 2.1, 247 pages (Feb. 27, 2017).
European Search Report for International Application No. EP 17190055.8, entitled "Policy Control Framework,", dated Jun. 12, 2017.
Final Office Action for U.S. Appl. No. 15/634,692, entitled "Internet of Things Services Architecture,", dated Jun. 5, 2018.
Non-Final Office Action for U.S. Appl. No. 15/634,692, entitled "Internet of Things Services Architecture,", dated Feb. 2, 2018.
Applying Network Policy Control to Asymmetric Traffic: Considerations and Solutions, *Sandvine Intelligent Broadband Networks, An Industry Whitepaper,* Version 2.0, pp. 1-14.
"Inter-Service Provider IP Backbone Guidelines, PRD IR.34, Version 4.9," GSM Association, Official Document IR.34, pp. 1-48 (2010).
LTE International Roaming Whitepaper, http://carrier.huawei.com/en/technical-topics/core-network/LTE-roaming-whitepaper, pp. 1-16, [retrieved on Apr. 22, 2016].
Manulis, M., et al, "Authenticated Wireless Roaming via Tunnels: Making Mobile Guests Feel at Home," *Proceedings of the ACM Symposium on Information, Computer and Communications Security (ASIACCS'09),* pp. 1-22 (2009).
McKeown, N., et al., "OpenFlow: Enabling Innovation in Campus Networks," retrieved from archive.openflow.org/documents/openflow-wp-latest.pdf (2008).
"Online Charging with Diameter Gy: Considerations for Accuracy and Reliability," *Sandvine Intelligent Broadband Networks, An Industry Whitepaper,* Version 2.0, pp. 1-10.
"OpenFlow Switch Specification, Version 1.3.0 (Wire Protocol 0x04)," The Open Networking Foundation, pp. 1-105 (2012).
"Syniverse Hosted Roaming Policy Management, " *Syniverse Technologies, LLC.,* pp. 1-3 (2015).
"Syniverse Roaming Control Center," *Syniverse Technologies, LLC.,* pp. 1-3 (2014).
"Syniverse Roaming Intelligence Suite," *Syniverse Technologies, LLC.,* pp. 1-3 (2014).
"Syniverse User Experience Management," *Syniverse Technologies, LLC.,* pp. 1-5 (2016).
International Search Report and Written Opinion for Int'l Application No. PCT/US2018/039759, titled: Internet of Things Services Architecture, dated Sep. 26, 2018.
Non-Final Office Action for U.S. Appl. No. 15/634,692, entitled "Internet of Things Services Architecture,", dated Sep. 27, 2018.
Final Office Action for U.S. Appl. No. 15/634,692, entitled "Internet of Things Services Architecture,", dated Feb. 27, 2019.
Notice of Allowance for U.S. Appl. No. 15/634,692, entitled "Internet of Things Services Architecture", dated Jul. 10, 2019.
Arkessa, "Arkessa Demonstrate eSIM and eUICC profile switching in Germany," [Online]; [Retrieved on Feb. 10, 2020], Retrieved from the Internet URL: https://www.arkessa.cominews/arkessa-demo-esim-euicc-profile-switchi; 3 pages (Mar. 13, 2017).
GSM Association, "Remote Provisioning Architecture for Embedded UICC Technical Specification," Version 2.1, 297 pages (Nov. 1, 2015).
Rogers, Wireless: "Embedded Uicc Remote Provisioning Discussion," Retrieved from the Internet:URL:http://www.3gpp.org/ftp/tsg_sa/WG3_Security/TSGS3_LI/2012_46_Quebec,/ [retrieved on Mar. 22, 2013], vol. SA WG3, No. Quebec City, Canada (2013).
Notice of Allowance for U.S. Appl. No. 15/634,692, titled: "Internet of Things Services Architecture," dated Nov. 8, 2019.
Non-Final Office Action for U.S. Appl. No. 16/668,739, titled: "Internet of Things Services Architecture,", dated May 29, 2020.
Notice of Allowance for U.S. Appl. No. 16/668,739, entitled "Internet of Things Services Architecture;", dated Oct. 23, 2020.

* cited by examiner

POLICY CONTROL FRAMEWORK

BACKGROUND

Service providers in general and mobile network operators (MNOs) in particular provide a range of communications' services to corresponding subscribers. Such services include, for example, voice, voice over Internet Protocol (IP), voice over long term evolution (LTE), streaming, broadcasting, multicasting, or other services. In providing such services, service providers typically implement different functionalities, e.g., billing functionalities, quality of service (QoS) functionalities, etc., to manage the offered services and the corresponding usage by subscribers.

In order to expand geographical coverage of offered services beyond the network coverage of each service provider, service providers typically engage in interworking and roaming arrangements. The interworking and roaming arrangements between different service providers are made possible through interconnection between the service providers. Interconnection between service providers is typically realized through one or more inter-service provider systems. Given that the Internet Protocol (IP) is widely employed across different communication networks and different services associated with service providers, the inter-service provider systems are typically designed to provide interconnection between different service providers at the IP traffic level, and to employ IP addressing. Examples of such inter-service provider systems include General Packet Radio Service (GPRS) Roaming eXchange (GRX) networks and IP Packet eXchange (IPX) networks. Interconnection between service providers may be achieved through an inter-service provider IP backbone, which represents a collection of GRX and/or IPX networks. Most data roaming traffic today is brokered by GRX/IPX providers that provide inter-operator connectivity for third generation (GRX) and Long Term Evolution (IPX) mobile networks.

SUMMARY

Embodiments of the present disclosure enhance a mobile subscriber's roaming experience by increasing the mobile subscriber's comfortability, control, and knowledge of their roaming data service. The systems and methods of the present disclosure provide a powerful traffic detection and enforcement tool that leverages its location on an interconnect network (i.e., inter-service provider network or system, IPX, etc.) to enable a highly customizable data roaming service for mobile subscribers. In some embodiments, mobile network operators are provided with real-time visibility and control of their mobile subscribers data traffic as it passes through the interconnect network. This enables mobile operators to monitor and control the roaming service being offered to their mobile subscribers from within the interconnect network.

Embodiments of the present disclosure enable a single framework to be put into place by an inter-service provider that may be utilized by multiple mobile networks. This saves mobile operators time and money as they do not need to invest in their own roaming policy control system.

According to at least one example embodiment, the present disclosure may be implemented in the form of a method or corresponding apparatus for performing roaming traffic detection and enforcement according to a roaming policy. The at least one example embodiment may include a user network device roaming in a visited communications network, the user network device being subscribed to a home communications network. The at least one example embodiment further includes an interconnect network communicatively coupling the visited communications network and the home communications network. According to another aspect of the example embodiment, the interconnect network may include a roaming policy database configured to store an identifier associated with the user network device, and a roaming policy for the user network device. The interconnect network may also include a traffic detection and enforcement module.

According to some embodiments, the traffic detection and enforcement module may be configured to identify a data request being sent from the user network device in the visited mobile network by reading the identifier in the data request, and deny or allow the data request based on the roaming policy.

According to some embodiments, the traffic detection and enforcement module may allow the data request based on the roaming policy by accepting the data request, diverting the data request, rewriting the data request, and/or enriching the data request.

According to some embodiments, the traffic detection and enforcement module may deny the data request based on the roaming policy by rejecting the data request, dropping the data request, injecting the data request, and/or shunting the data request.

According to at least one other example embodiment, the roaming policy may indicate that roaming is deactivated for a user network device. In some embodiments, the traffic detection and enforcement module may be further configured to deny the data request before a data bearer is established; preventing the home communication network from being charged for the data request. According to other embodiments, the traffic detection and enforcement module is further configured to insert an access-restriction-data attribute-value pair in the data request.

According to at least one other example embodiment, the data request may be a session create request. According to some embodiments, the traffic detection and enforcement module utilizes deep packet inspection to identify the data request.

According to at least one other example embodiment, the roaming policy database may be further configured to store an index of website addresses for one or more websites with a plurality of location dependent versions. According to at least one other aspect of the example embodiment, the roaming policy may further indicate a user location preference associated with the user network device, and the traffic detection and enforcement module may determine if the data request is requesting one of the websites from the index of website addresses, and modify the data request based on the user location preference associated with the user network device.

According to at least one other aspect of the example embodiment, the traffic detection and enforcement module may utilize deep packet inspection to determine if the data request is requesting one of the websites from the index of website addresses. According to at least one other aspect of the example embodiment, the traffic detection and enforcement module may be further configured to pass the data request unmodified if the user location preference is the home communications network's location.

According to at least one other aspect of the example embodiment, the system or method may further include a roaming policy portal configured to enable a mobile subscriber associated with the user network device to alter the user location preference. According to at least one other aspect of the example embodiment, the one or more websites with a plurality of location dependent versions include search features.

According to at least one other example embodiment, the system or method may further include a roaming policy portal configured to enable a mobile subscriber associated with the user network device to alter the roaming policy. According to at least one aspect of the example embodiment, the roaming policy may further include permissions allowing or denying access to one or more services (e.g., data services, applications, websites, etc.). According to at least one other aspect of the example embodiment, the traffic detection and enforcement module may be further configured to determine if the data request includes a request to access at least one service of the one or more services, and whether the permissions in the roaming policy allows or denies access to the at least one service.

According to at least one other aspect of the example embodiment, the roaming policy may further include a user defined data limit for the at least one service of the one or more services, and a record of data consumed by the at least one service. In some embodiments, the traffic detection and enforcement module may be further configured to track an amount of data consumed by the at least one service, and update the record of data consumed with the tracked amount of data consumed by the at least one service.

According to at least one other aspect of the example embodiment, the traffic detection and enforcement module may be further configured to deny access to the at least one service upon the record of data consumed by the at least one service reaching the user defined data limit.

According to at least one other aspect of the example embodiment, the roaming policy portal (e.g., an application, a web portal, etc.) may be further configured to display (in real-time) the permissions allowing or denying access to the one or more services, and the record of data consumed by the at least one service. In some embodiments, the roaming policy portal enables the mobile subscriber to alter a second roaming policy for a second user network device.

According to at least one other aspect of the example embodiment, the traffic detection and enforcement module may utilize deep packet inspection to determine if the data request includes a request to access at least one service. According to some embodiments, the one or more services include applications and/or websites.

According to at least one other aspect of the example embodiment, the roaming policy may further include a data shaping profile with a bandwidth limit for at least one service. The traffic detection and enforcement module may be further configured to shape data consumed by the at least one service based on the data shaping profile. According to some embodiments, the traffic detection and enforcement module may be further configured to monitor roaming data usage for the user network device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

The teachings of all patents, published applications and references cited herein are incorporated by reference in their entirety.

Wireless communication networks offer numerous wireless services to their subscribers. For each network provider, the consumption of such services by the corresponding subscribers is typically managed within the provider's network. When a subscriber of a home wireless network is roaming in a visited network, the consumption of services by the roaming subscriber is typically managed by the home network or the visited network.

In order to expand geographical coverage of offered services beyond the network coverage of each service provider, service providers typically engage in interworking and roaming arrangements. The interworking and roaming arrangements between different service providers are made possible through interconnection between the service providers. Interconnection between service providers is typically realized through one or more inter-service provider systems (i.e., interconnect networks). Given that the Internet Protocol (IP) is widely employed across different communication networks and different services associated with service providers, the inter-service provider systems are typically designed to provide interconnection between different service providers at the IP traffic level, and to employ IP addressing. Examples of such inter-service provider systems include General Packet Radio Service (GPRS) Roaming eXchange (GRX) networks and IP Packet eXchange (IPX) networks. Interconnection between service providers may be achieved through an inter-service provider IP backbone, which represents a collection of GRX and/or IPX networks.

Figure 1:
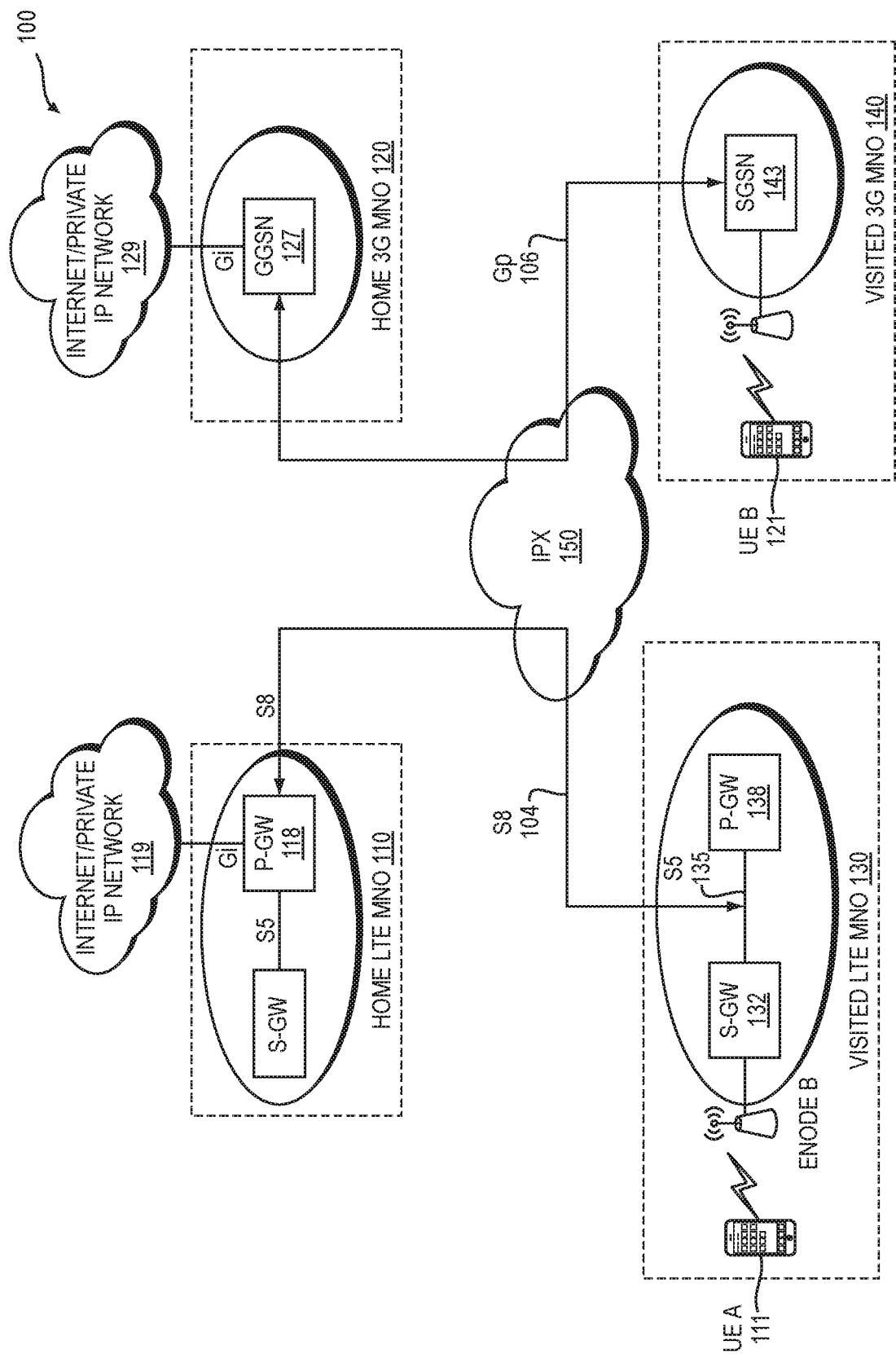
FIG. 1 is a diagram illustrating an example communications system employing an interconnect network between multiple wireless networks.

FIG. 1 is a communications system 100 employing an IP packet eXchange (IPX) system 150 intermediate between multiple wireless networks, e.g., 110, 120, 130, and 140. Specifically, the communications system 100 depicts an architecture supporting roaming services, and other services, associated with both third generation (3G) networks, e.g., 120 and 140, and long term evolution (LTE) networks, e.g., 110 and 130. According to at least one example embodiment, in LTE roaming, the IPX system 150 provides IP transport between a serving gateway (S-GW) 132 in a visited LTE network 130 and a packet data network (PDN) gateway (P-GW) 118 in a Home LTE network 110. In 3G roaming, the IPX system 150 provides IP transport between a serving GPRS support node (SGSN) 143 of a visited 3G network 140 and a gateway GPRS support node (GGSN) 127 in a home 3G network 120.

In LTE, the interface between the visited S-GW 132 and the home P-GW 118 is referred to as S8 in interface 104. The S-8 interface 104 is a tunnel protocol based on IP user datagram protocol (IP-UDP), and enables user equipment (UE), e.g., 111, to access an IP packet network 119 through the home P-GW 118. In 3G roaming, the interface between visited SGSN 143 and the home GGSN 127 is referred to as Gp interface 106. The Gp interface 106 is also an IP-UDP based tunnel protocol with a different version, compared to the S8 interface. The Gp interface 106 enables the UE 121 to access an IP packet network 129 through the home GGSN 127. User data packets are exchanged across the IPX system 150 using a GPRS tunneling protocol (GTP). The GTP usually employs UDP and has different versions in 3G and LTE networks.

The data transferred across the S8 interface 104, or the Gp interface 106, typically includes control-plane data and user-plane data. Typically, a control channel and a user data channel are established between the two network elements, e.g., S-GW 132 and P-GW 118 or SGSN 143 and GGSN 127, in response to a network access request. Control-plane data is usually exchanged through the control channel between the S-GW 132, or SGSN 143, and the P-GW 118, or GGSN 127, to setup/delete a packet data protocol (PDP) context for a UE, e.g., 111 or 121. In particular, resources and tunnel identification associated with a user communications call or session are negotiated, based on a user's identification and policy, at the control-plane in response, for example, to a network access request. The negotiated parameters are then used to establish, and/or maintain, a user data channel, or tunnel. User data is typically transferred between service provider networks, e.g., 130 and 110 or 140 and 120, through the user data channel established. Data packets (i.e., data requests) sent across the GTP tunnel, e.g., 104 or 106, are de-multiplexed at the P-GW 118, or GGSN 127, and then forwarded, for example, to the external packet network, e.g., 119 or 129. Also, data packets received from the external packet network, e.g., 119 or 129, are multiplexed by the P-GW 118, or GGSN 127, and sent through the GTP tunnel, e.g., 104 or 106, to UEs, e.g., 111 or 121.

The control-plane mechanism may be implemented using, for example, the GTP-control (GTP-C) protocol, proxy mobile IP (PMIP), or the like. For example, the Gp interface 106 employs GTP-C version 1, whereas the S8 interface 104 employs GTP-C version 2. Similarly, the user data plane mechanism may be implemented in various ways. For example, when GTP-C version 1 is employed as the control protocol, the GTP-User (GTP-U), version 0 or 1, protocol is employed for user data transfer, for example, across the Gp interface 106. Also, the GTP-U version 1, which is updated in 3rd Generation Partnership Project (3GPP) specifications to support LTE, is typically employed in transferring user data, for example, across the S8 interface 104, when the GTP-C version 2 protocol is employed as the corresponding control protocol.

At the control-plane, control messages are typically exchanged between the S-GW 132, or SGSN 143, serving the UE 111 or 121 and the P-GW 118, or GGSN 127, configured to provide connectivity to external packet data networks, e.g., 119 or 129. Specifically, upon the UE 111 or 121 requests network access, a message requesting creation of a PDP session or context is sent from the S-GW 132, or SGSN 143, to the P-GW 118, or GGSN 127. The P-GW 118, or GGSN 127, responds back with the details of a created PDP context or with a failure message. For example, in GTP-C version 1 protocol, the messages "Create PDP Context Request" and its response "Create PDP Context Response" message are used. In GTP-C version 2 protocol, the control message "Create Session Request" and the corresponding response message "Create Session Response" are employed. In the PMIP protocol, the messages "Proxy Binding Update" and "Proxy Binding Ack" are used to initiate a session.

The IPX network 150 is typically designed to support connections between service providers at the first, second, and/or third network layers. That is, the IPX network 150 is typically configured to access tunnel-specific information in data packets exchanged between two tunnel end points, such as S-GW 132 and P-GW 118. In other words, the IPX network 150 typically accesses information associated with the first, second and third network layers within data packets. A typical IPX network, for example, does not access information within data packets indicative of user-specific or session specific data flows, e.g., information associated with the fourth and/or fifth network layers. As such, IPX network providers of existing IPX networks do not provide policy control services for per user usage monitoring, control, and quality of service (QoS), for example, at the UE level. Service management functionalities are typically performed by mobile operators (e.g., monitoring service usage by users while roaming, notifying users when usage reaches a certain level, enforcing quality of service (QoS), and/or throttling control to each UE's data session), and are typically not offered by the IPX given the limited visibility with respect to information associated with exchanged data packets transmitted across the IPX network 150.

According to embodiments of the present disclosure, the IPX network 150, utilizing a policy control platform, accesses information within data packets/data requests indicative of user-specific or session specific data flows, (e.g., information associated with the fourth and/or fifth network layers). By accessing user specific and/or specific data flows, the IPX network is able to implement a real-time roaming control to offer enhanced roaming control and monitoring to network providers, and directly to mobile subscribers themselves.

Figure 2A:
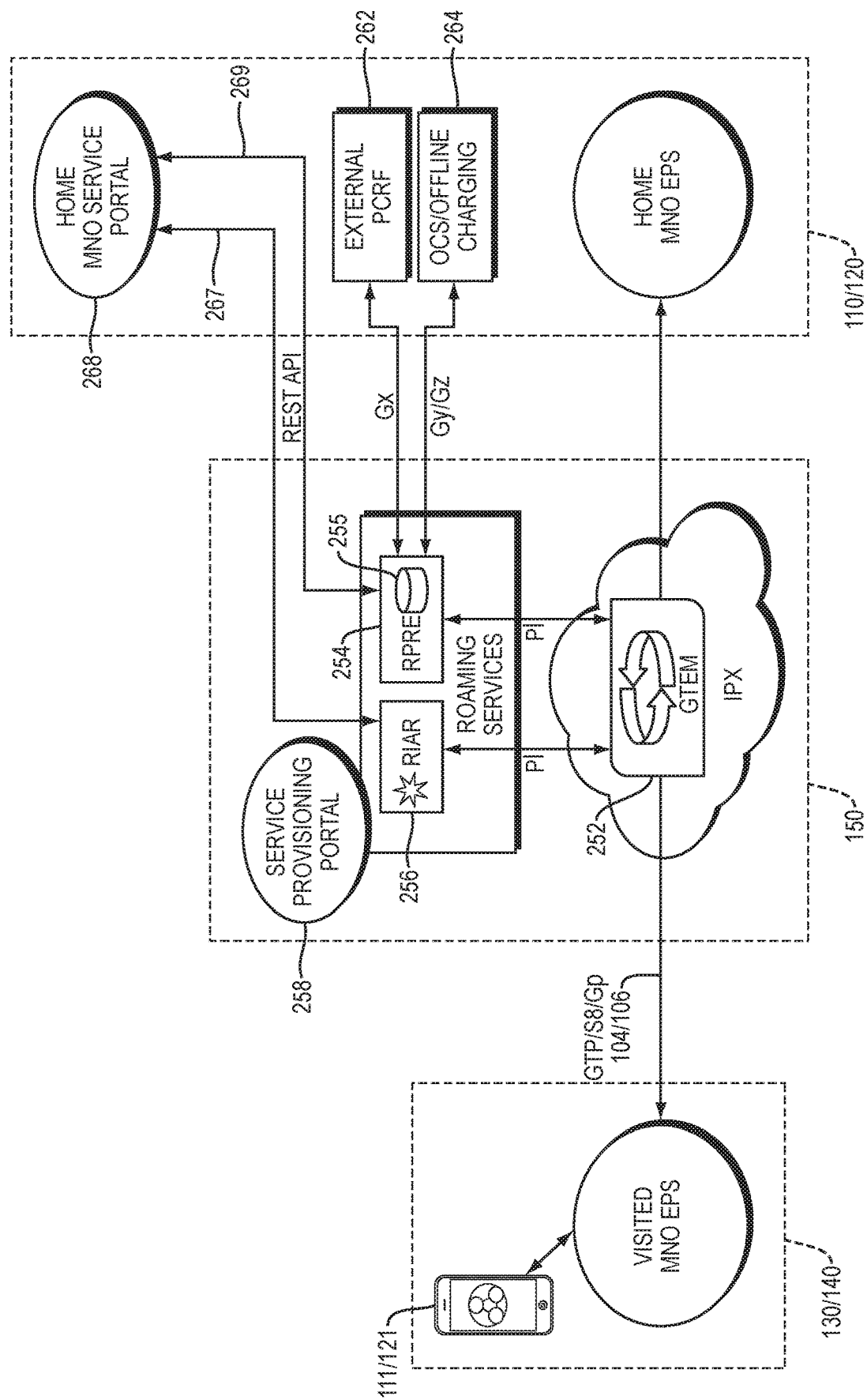
FIG. 2A is a high level block diagram of the roaming policy control framework according to some embodiments.

FIG. 2A is a high level block diagram of the roaming control platform according to some embodiments of the present disclosure. According to at least one example embodiment, a user network device 111/121, belonging to a mobile subscriber subscribed to a home communications network 110/120, is roaming in a visited communications network 130/140. An interconnect network 150 (e.g., IPX network) communicatively couples the visited communications network 130/140 and the home communications network 110/120. According to some embodiments, the interconnect network 150 may contain a roaming policy rule engine (RPRE) 254 that includes a roaming policy database 255 configured to store an identifier associated with the user network device 111/121, and a roaming policy for the user network device 111/121. The roaming policy may be a customizable individualized roaming policy for a user network device. Alternatively, the roaming policy may be applied to a plurality of user network devices.

According to some embodiments, the roaming policy for the user network device 111/121 may indicate the specific roaming data services (e.g., applications that use data, web browsing, specific websites, etc.) available, set limits on the amount of useable roaming data, set limits on roaming data per data service, as well as other features detailed in the embodiments below. In some embodiments, the roaming policy is fully customizable and may be altered in real-time by the mobile subscriber, the home communication network operator (HMNO), and/or the visited communication network operator (VMNO).

According to some embodiments, the interconnect network 150 contains a GTP based traffic detection and enforcement module (GTEM) 252. The GTEM 252 may be configured to identify a data request (e.g., GTP data packet) being sent from the user network device 111/121 in the visited mobile network 130/140 by reading the identifier in the data request, and deny or allow the data request based on the roaming policy for the user network device 111/121. The GTEM 252 may determine whether to deny or allow the request by accessing the roaming policy database 255 in the RPRE 254, and may ascertain the roaming policy for the user network device 111/121.

In some embodiments, the GTEM 252 is an inline device with a bypass mechanism which does not affect network topology and the transmission of data if the GTEM 252 stops operating.

According to some embodiments, the GTEM 252 may access the GTP control-plane and the GTP data plane (i.e., user plane) to inspect the control messages, signaling, and/or data being transmitted between the user network device 111/121 on the visited communication network 130/140 and the home communication network 110/120. This enables the GTEM 252 to enforce the user network device's 111/121 specific roaming policy by identifying the GTP message or data packet originating from the user network device 111/121 by reading the respective identifier from the message header, and taking the appropriate action (or non-action) based on the user network device's 111/121 roaming policy.

In some embodiments, the GTEM 252 utilizes deep packet inspection (DPI) to examine and inspect the GTP data traffic as it passes through the interconnect network 150. The GTEM 252 is not only able to determine the user network device sending or receiving the data packet/request, but is also able to identify the data service (e.g., application, website, etc.) being used.

According to some embodiments, the GTEM 252 inspects data packets for signatures of data services, and compares the signature from the data packet to known signatures for data services stored in a signature database to determine the data service being used or requested by the data packet. In some embodiments, the GTEM 252 utilizes a finite state-machine to minimize false positives and signature guessing. In some embodiments, the GTEM 252 utilizes a multipath signature analysis designed to identify the signatures of polymorphic applications.

In some embodiments, for each data packet from the user network device 111/121, the GTEM 252 may transmit the amount of data and the data service to the RPRE 254. The RPRE 254 may receive this information and store (or update a count of) the total amount of roaming data used per data service for each user network device 111/121. The RPRE 254 is then able to keep a running count of the data used by each user network device 111/121 on a per data service basis. According to some embodiments, once a data limit in the roaming policy is reached the GTEM 252 will take the appropriate action for any further data packets. This enables the GTEM 252 to enforce any data limits set in the user network device's 111/121 roaming policy.

Figure 2B:
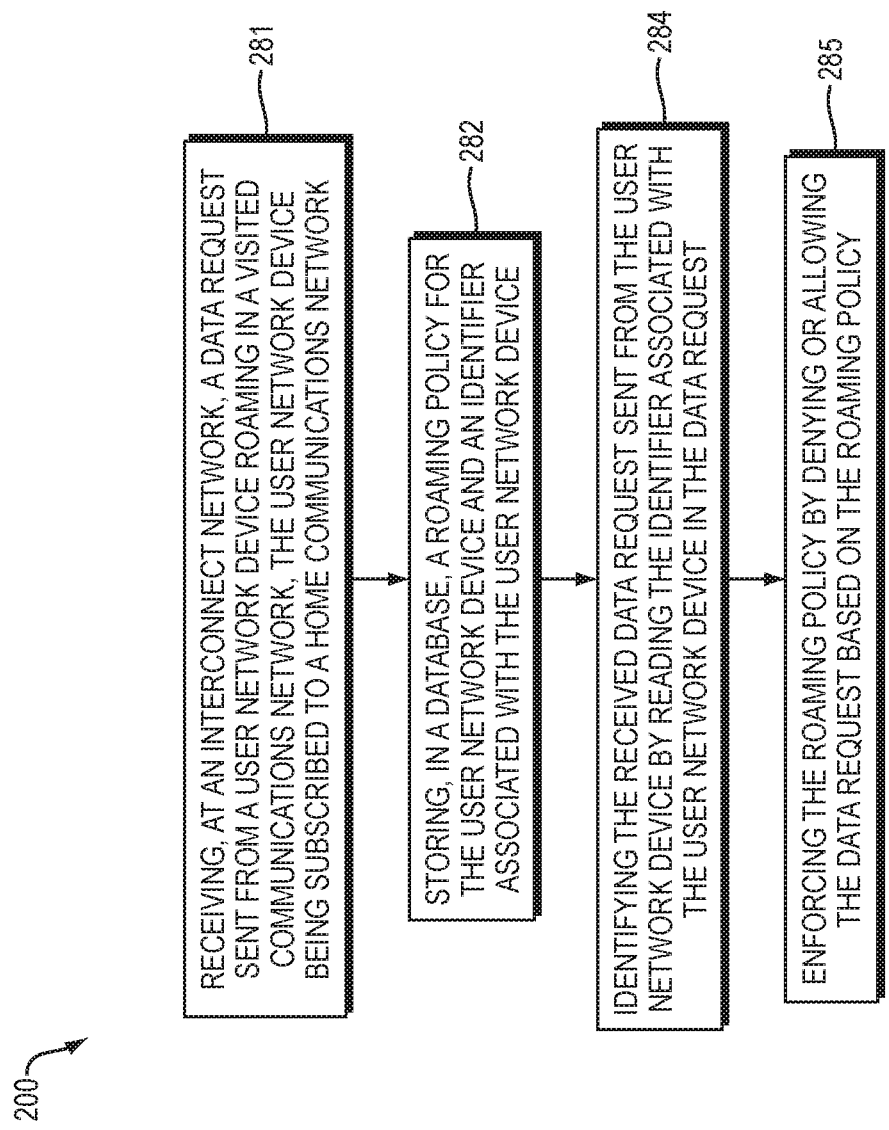
FIG. 2B is a flow chart illustrating an example method for performing roaming traffic detection and enforcement according to a roaming policy.

FIG. 2B is a flow chart illustrating an example method 200 for enforcing a data roaming policy. According to the example method, the GTEM 252 (located on the interconnect network 150) receives 281 a data request sent from a user network device 111/121 roaming in a visited communications network 130/140, the user network device 111/121 being subscribed to a home communications network 110/120. According to another aspect of the example method, the RPRE 254 stores 282 (in a data base 255) a roaming policy for the user network device 111/121 and an identifier associated with the user network device 111/121. Receiving the instructions with policy rules from the RPRE 254, the GTEM 252 identifies 284 the received data request sent from the user network device 111/121 by reading the identifier associated with the user network device 111/121 in the data request. The GTEM 252 then enforces 285 the roaming policy by denying or allowing the data request based on the roaming policy.

According to some embodiments, the GTEM 252 filters the data traffic (packets and requests) based on the information extracted from the data traffic and the roaming policy of the originating user network device. While filtering the data traffic, the GTEM 252 may act as a transparent "firewall" that filters data packets and connections. In some embodiments, once the GTEM 252 accepts a connection, all of the data packets transferred in the connection or data path are subsequently inspected for conformance to the respective roaming policy.

For a non-limiting example, the GTEM 252 may filter data packets and connections in the following ways. (1) Accept the connection based on predefined criteria. (2) Reject the connection, terminating the flow by sending a TCP RST (reset) packet or an Internet Control Message Protocol (ICMP) destination unreachable message to the peers (e.g., the user network device and targeted destination). (3) Silently drop the packet and discard the flow. (4) Inject the packet with a fake server response and send it to the originating user network device based on the rule's inject data (e.g., HTTP traffic inject (302)). (5) Rewrite certain packet fields by changing the packet fields to those specified in the rule's RewriteObject. In some embodiments, RewriteObjects can rewrite a connection's VLAN, DSCP, or do full source and destination NAT. (6) Enrich the packet by adding enrichment objects to the HTML header. (7) Shunt the connection by selectively ignoring parts of the data traffic. (8) Divert the packet or connection.

According to some embodiments, the GTEM 252 may divert data packets or connections by steering them to or through modules or devices that may perform additional functions not supported by the GTEM 252. These modules or devices may perform value added services, such as, caching, HTML rewriting, video optimization, security functions, etc.

In some embodiments, the GTEM 252 may be configured to trigger actions when certain user-defined (e.g., HMNO, mobile subscriber, VMNO, etc.) criteria are met. The user-defined criteria may be based on counters or thresholds that may be customized to perform complex operations. For example, the GTEM 252 may trigger a message (e.g., an email, text, voice message, phone call, etc.) to be sent to a network operator when certain criteria are met. In some embodiments, the GTEM 252 executes a host trigger when a host or provisioned identifier reaches a certain threshold. In some embodiments, the GTEM 252 executes a filtering trigger that executes when a matching filtering rule is triggered. In some embodiments, the GTEM 252 executes a subscriber trigger to reset updates based on subscriber session events, such as counter thresholds being met.

Referring back to FIG. 2A, according to some embodiments, the interconnect network 150 includes a real-time intelligent analysis and reporting module (RIAR) 256 that provides real-time visibility into the GTP signaling/data and other IP data payloads inspected by the GTEM 252. In some embodiments, the RIAR 256 provides a real-time view of the quality of experience (QoE) metrics of the user network device 111/121 to the individual subscriber who owns the user network device 111/121, and/or mobile network operators (e.g., VMNO, HMNO, interconnect network operator, etc.). The QoE metrics may be locally stored by the RIAR 256 or exported to external systems.

According to some embodiments, the interconnect network 150 includes a service provisioning portal 258 that enables the individual mobile subscriber who owns the user network device 111/121 (or has sufficient permissions) to edit the user network device's roaming policy in the roaming policy database 255 and/or dynamically monitor the user network device's data usages and metrics being reported by the RIAR 256. In other embodiments, the home communication network 110/120 may include a HMNO service portal 268 which enables the home communication network operator (HMNO) to edit the network device's roaming policy through the use of an application programing interface (API) 269. The HMNO service portal 268 may also receive QoE metrics from the RIAR 256, thus enabling the home communication network operator monitor the QoE metrics for roaming mobile subscribers and their user network devices.

In some embodiments, the HMNO may allow their mobile subscribers access to the HMNO service portal 268, as an alternative to allowing the mobile subscribers to directly access the service provisioning portal 258 on the interconnect network 150. This would give the HMNO more control over how the mobile subscribers can alter the roaming policies of their user network devices, and the data metrics the mobile subscribers can monitor. Additionally, the HMNO may prefer to use a HMNO service portal 268 in order to integrate the roaming policy control with other non-roaming policy controls or any other type of control and access the HMNO wishes to give their subscribers.

According to some embodiments, the RPRE 254 may be configured to (or at least interface with) access the Policy and Charging Rules Function (PCRF) 262 of the home communication network 110/120. This enables the HMNO to directly control the roaming policy of the user network device 111/121 by using the GTEM 252 on the interconnect network 150. This may be beneficial as data packets can be denied, modified, rerouted, etc. on the interconnect network 150 before they reach the home communication network 110/120. Thus, giving the HMNO control over user network device's data roaming usage even before the data packets/requests reach the home communication network 110/120.

According to some embodiments, the RPRE 254 may be configured to (or at least interface with) access the Online Charging System (OCS)/Offline Charging System 264 of the home communication network 110/120. In some embodiments, the RPRE 254 may interface with the OCS 264 via a Gy interface, providing the RPRE 254 real-time access to the rating plans for rating, charging, and monitoring the credit of pre-paid mobile subscribers. Thus, if a pre-paid mobile subscriber has used all of their pre-paid credit (e.g., a data amount, dollar amount, etc.), the GTEM 252 may block the pre-paid mobile subscriber's roaming data access before any more roaming data is used.

According to at least one example embodiment, the RPRE 254 may interface (e.g., using a Gx interface) with the home communication network's PCRF 262 or any other external PCRF. In some embodiments, the home communication network's operator (HMNO) may use the PCRF 262 to control the user network's device's 111/121 access on per data service (i.e., application, website, etc.) level. In other words, the (HMNO) may monitor and control the particular data services the user network device 111/121 uses or accesses while roaming. The HMNO is able to edit the user network device's roaming policy through the Gx interface between the PCRF 262 and RPRE 254.

Figure 3:
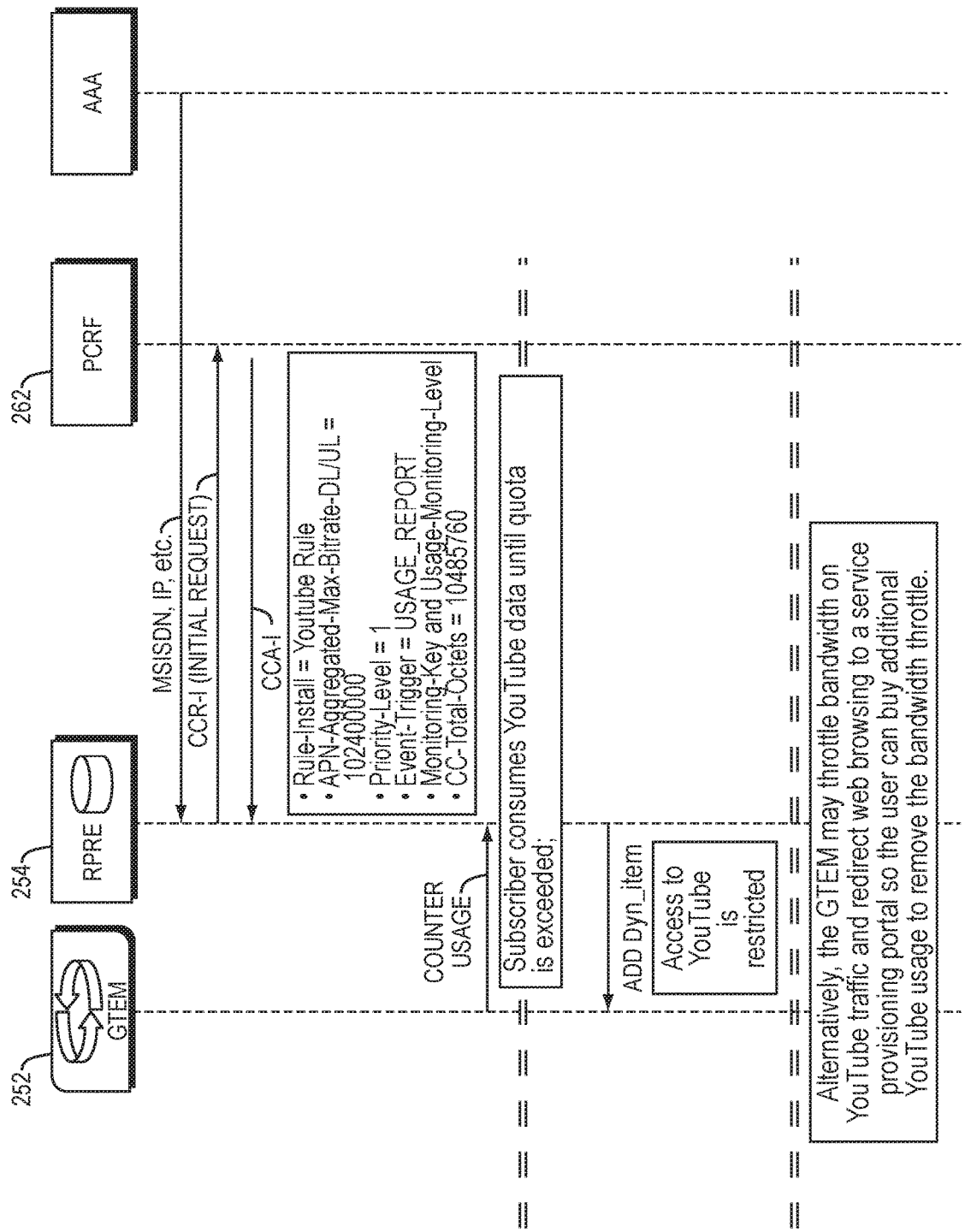
FIG. 3 is an example roaming policy control flow for a given data service.

FIG. 3 is a signaling flow illustrating the HMNO's PCRF 262 controlling a user network device's access to a particular data service. More specifically, the signaling flow illustrated in FIG. 3 is for an example embodiment where the HMNO uses the GTEM 252 to control a user network device's access to a particular data service (e.g., YOUTUBE) while roaming. According to the example embodiment, the HMNO identifies a network user device by sending a unique identifier (e.g., IMSI, MSISDN, IP, etc.) from the PCRF 262 to the RPRE 254. The RPRE 254 then requests a rule from the PCRF 262 establishing how the user network device's roaming data service is to be controlled.

According to some embodiments, the PCRF edits the roaming policy for the user network device in the RPRE 254 by installing or adding the data service rule to the respective roaming policy for the user network device. For a non-limiting example, the data service rule may specify the data service to be controlled or limited (e.g., YOUTUBE), how to handle data requests from the user network device to the data service, the amount of data the user network device may utilize with the data service, the action to take once that amount is reached, etc.

According to the example embodiment of FIG. 3, the rule installed in the RPRE 254 limits the user network device's use of the data service YOUTUBE to a certain amount of data (i.e., a data quota or threshold). After the predefined amount of data is reached, the RPRE 254 will signal the GTEM 252 to begin denying the user device access to the data service YOUTUBE.

In some embodiments, the GTEM 252 may monitor the amount of data being used by the data service on a per data packet basis, and report the data usage to the RPRE 254 which stores a running data count of the data service for the user network device. This enables the RPRE 254 to track the data being used by a user network device for a particular data service, and signal the GTEF 252 to begin restricting access to the data service once a data threshold is reached. According to some embodiments, GTEF 252 may restrict the user network device's access to the data service, for example, by completely denying access, throttling the data connection, and/or redirecting the user network device's web browser to the service provisioning portal 258 or the home MNO service portal 268. In some embodiments, once the user network device is redirected to a service provisioning portal, the mobile subscriber may be offered additional data usage for the data service.

Figure 4:
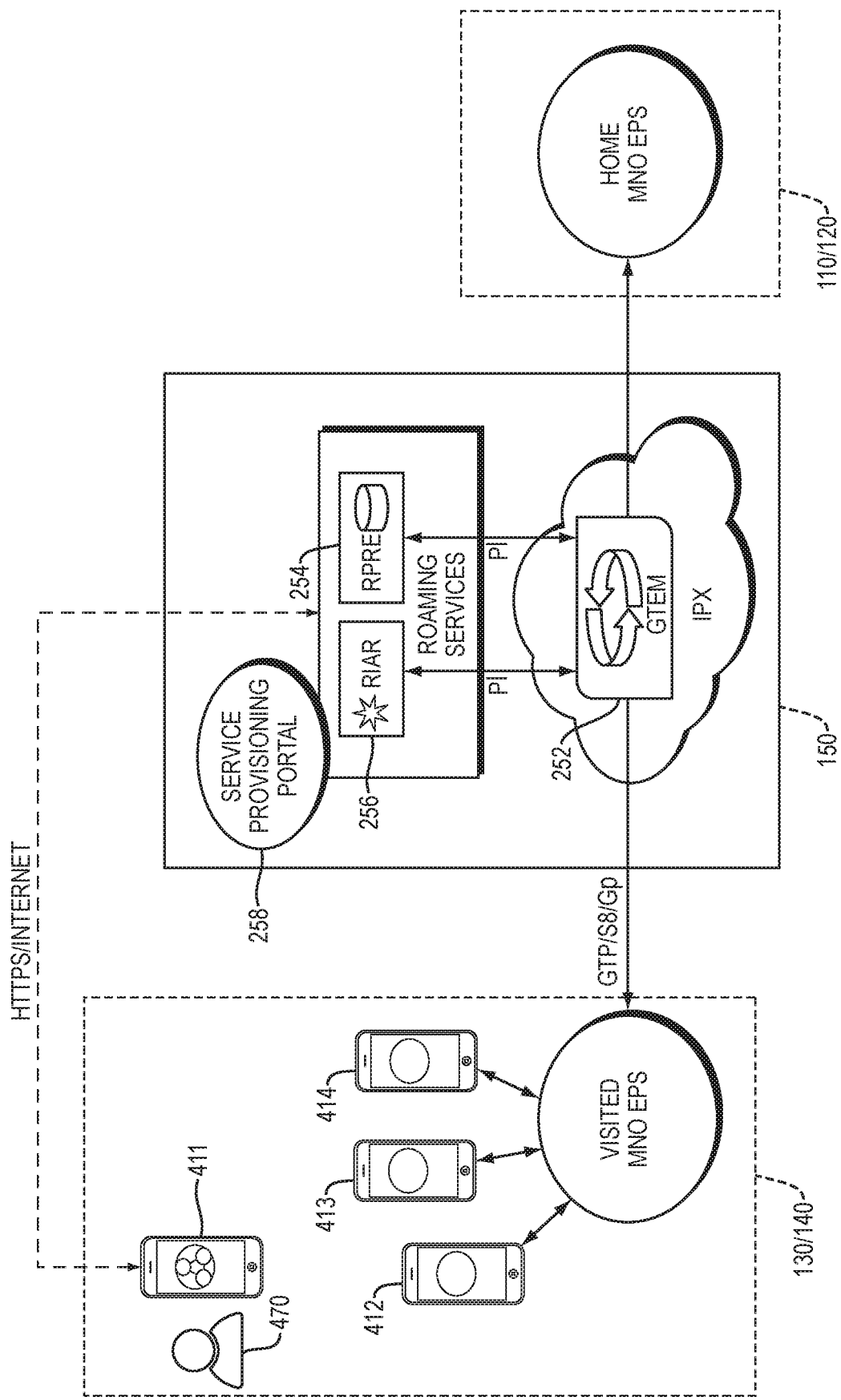
FIG. 4 is a high level block diagram of the roaming policy control framework illustrating a mobile subscriber controlling the roaming policy of one or more user network devices.

FIG. 4 is a diagram illustrating an example embodiment of the present disclosure. According to the example embodiment of FIG. 4, an individual mobile subscriber 470 is able to monitor and set the data roaming policies of one or more user network devices 411-414 in real-time through a service provisioning portal 258 (e.g., a web portal, mobile application, etc.). According to some embodiments, the individual mobile subscriber 470 may monitor and set the data roaming policy for any network device under the subscriber's mobile subscription or data plan. For instance, a parent may set the roaming policy for their children's user network devices, or a company may set the roaming policy for their employees' user network devices.

According to at least one example embodiment, an individual mobile subscriber 470 operating an user network device 411 (or any other device with access to a service provisioning portal 258) with permissions to monitor and set the data roaming of other user network devices 412-414, may alter or set up a roaming policy for each of the user network devices 411-414 individually or together. In some embodiments, the individual mobile subscriber 470 operates a web portal or mobile application to select which data services (e.g., mobile applications, web browsers, websites, etc.) each of the user network devices 411-414 may access while roaming. In some embodiments, the individual mobile subscriber 470 may set different data limits for each data service. For example, a parent may block one child from accessing FACEBOOK while roaming, limit another child's use of FACEBOOK to 1 gigabyte, and place no restrictions on the parent's user network device 411.

Figure 5:
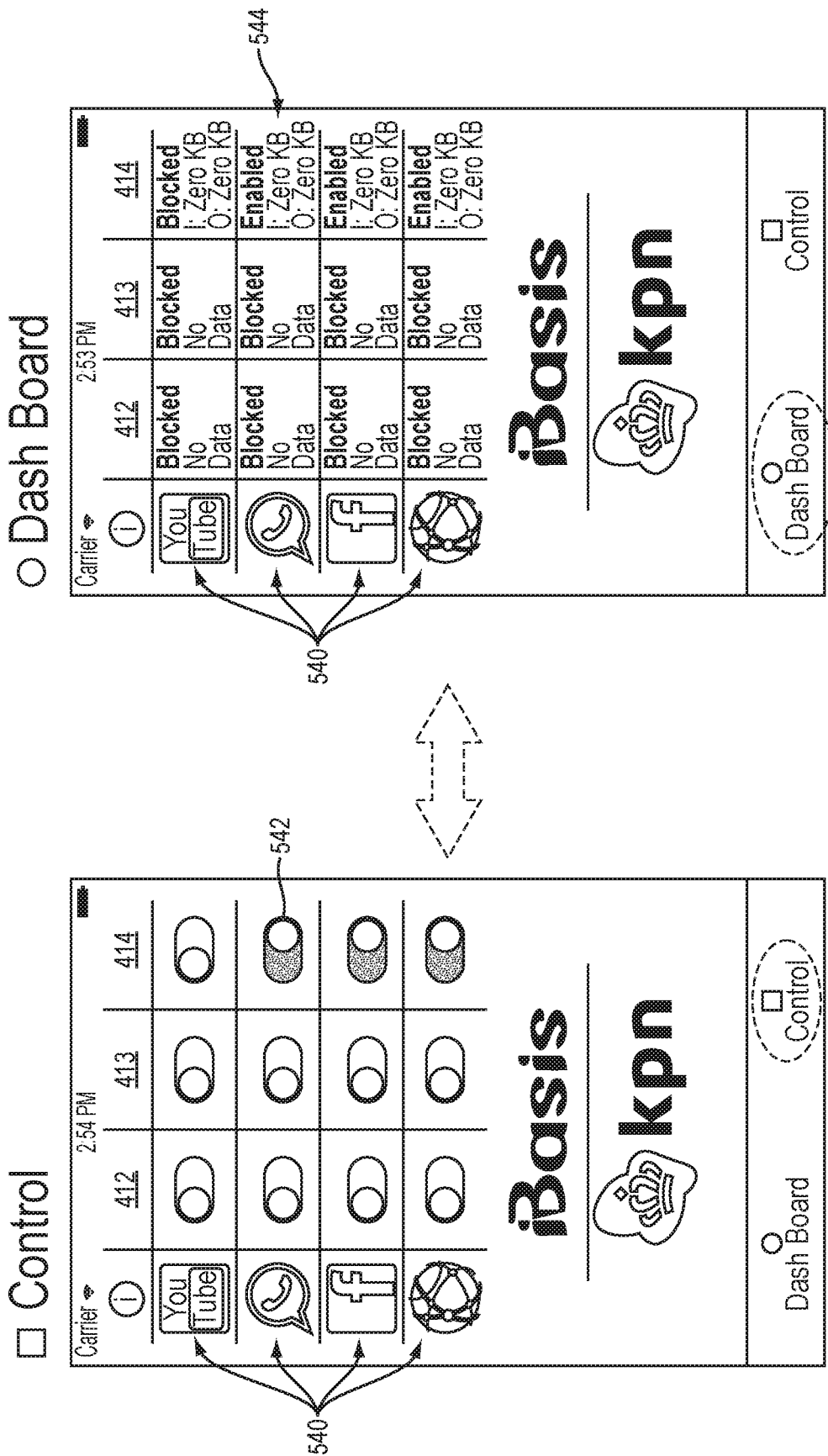
FIG. 5A is an example graphical user interface (GUI) of a mobile application for setting roaming policy for one or more user network devices.
FIG. 5B is an example graphical user interface (GUI) of a mobile application for monitoring roaming data access and roaming data usage for one or more user network devices.

FIG. 5A shows an example graphical user interface (GUI) of a mobile application for configuring a roaming policy for one or more user network devices 412-414. According to this example GUI, specific data services 540 are listed with a mechanism 542 to allow or deny data access to that data service for each user network device 412-414. In other embodiments, the GUI may also have a mechanism to set and activate a data limit for each service 540, a mechanism to throttle the data connection to each data service 540, and/or redirect the data connection for each service.

FIG. 5B shows an example GUI of a mobile application for monitoring the roaming data used and the access setting for each data service 540 for one or more user network devices 412-414. According to this example GUI, specific data services 540 are listed with an indication 544 whether data access to each data service 540 is either denied or allowed, and the amount of data that has been used by each data service 540 for the respective user network device 412-414. In other embodiments, the GUI may also indicate if the data service 540 is throttled, dropped, injected, shunted, or diverted, etc.

Referring back to FIG. 4, according to the example embodiment, the individual mobile subscriber 470 may set or alter the roaming policy in the RPRE 254 for each user network device 411-414. The GTEM 252 may monitor the data traffic and enforce the roaming policy for each user network device 411-414 roaming on the visited communications 130/140 network as described above.

These example embodiments enable individual mobile subscribers to directly control the roaming policy of not only their own device, but all the other devices on their mobile subscription or data plan. This gives mobile subscribers confidence that they or their children/employees will not over use expensive roaming data. It also allows parents to limit their children's Internet and mobile application use while on family vacations. Further, by placing the GTEM 252 on the interconnect network 150 the data policy is able to be enforced before the data traffic is reaches the home communication network 110/120. This improves efficiency and also can prevent a data bearer from being established, thus avoiding a bill from the visited communication network 130/140.

According to at least one other example embodiment, the GTEM 252 may be utilized to block small data packets from a roaming user network device 111/121 on a visited communications network 130/140 before the small data packet reaches the home communication network 110/120.

A home communication network 110/120 may have roaming deactivated for a user network device for any number of reasons. For example, the mobile subscriber may have asked the home communication network 110/120 to deactivate roaming on one or more user network devices to avoid any data roaming charges, or roaming may not be part of the mobile subscriber's data plan. Typically, when data roaming is deactivated for a user network device, the device still attempts to establish a data connection through a visited communications network. The user network device will attach to the visited communication network and the visited communications network will attempt to authenticate the user network device with its home communication network before providing a data connection. If the roaming policy at the home communication network indicates that roaming is deactivated or not authorized the authentication will fail and the visited communication network will not provide a data connection to the user network device.

However, occasionally before the visited communication network has sent an authentication message and received a response from the home communication network (or any other unknown reason), a small data packet will be generated from the visited communications network and sent to the home communication network. The transmission of this small data packet creates a billable event, even though the authentication eventually fails. The mobile subscriber who owns the user network device cannot be billed for the data packet, because they have roaming deactivated. This leaves the home communications network paying for the transmission of the small data packet. The cost of a single small data packet is minimal, but these charges can accumulate quickly as the user network device will continue to attempt establish a data connection while away from the home network, and the home communication network may have thousands of user devices creating these charges.

Embodiments of the present disclosure can prevent small data packets from being transmitted from the visited communications network to the home communications network inadvertently. According to some embodiments, data roaming for a user network device may be deactivated. As stated above, roaming for a user network device can be deactivated or not allowed numerous ways. For example, a mobile subscriber may request that the HMNO deactivate data roaming to avoid charges. Alternatively, the mobile subscriber may turn data roaming off themselves using a service provisioning portal. In the case where the HMNO has deactivated roaming for the user, the PCRF 262 interfaces with the RPRE 254 to set or edit the roaming policy for the particular user network device to indicate roaming is deactivated. In other embodiments, the mobile subscriber may deactivate roaming by setting or altering the roaming policy themselves using the service provisioning portal 258 (e.g., a web portal, mobile application, etc.).

According to at least one example embodiment, a network user device 111/121 with roaming deactivated attaches to a visited communications network 130/140 and attempts to establish a data roaming connection. According to the example embodiment, before the authentication signaling message is returned from the home communications network 110/120 indicating the user network device 111/121 is not authorized for data roaming, the user network device 111/121 attempts transmit at least one data packet from the visited communications network 130/140 to the home communications network 110/120.

According to the example embodiment, the at least one data packet is inspected by the GTEM 252 on the interconnect network 150. The GTEM 252 reads the identifier (e.g., IMSI, MSISDN, etc.) for the user network device 111/121 and checks roaming policy for the device 111/121 in the RPRE 254. If the roaming policy indicates that data roaming is deactivated the GTEM 252 prevents the at least one data packet from being transmitted, and because the at least one data packet is blocked on the interconnect network, a data bearer is not established and the home communications network operator is not charged for the data packet.

According to some embodiments, the GTEM 252 may insert an access-restriction-data (ARD) attribute value pair in the first and each subsequent Update Location Answer message. This alerts the visited communications network 130/140 the user network device 111/121 is not allowed to use roaming data. In some embodiments, the roaming policy for the network user device 111/121 in the RPRE 254 indicates to the GTEM 252 to block Session Create Request messages from the user network device 111/121 for non-IMS access point names (non-IMS APN) based on the first Update Location Request. By blocking any non-IMS APN data session initiation, no data bearer is established. Thus, no serving gateway (S-GW) charging data record (CDR) would be generated by the visited communications network.

Figure 6:
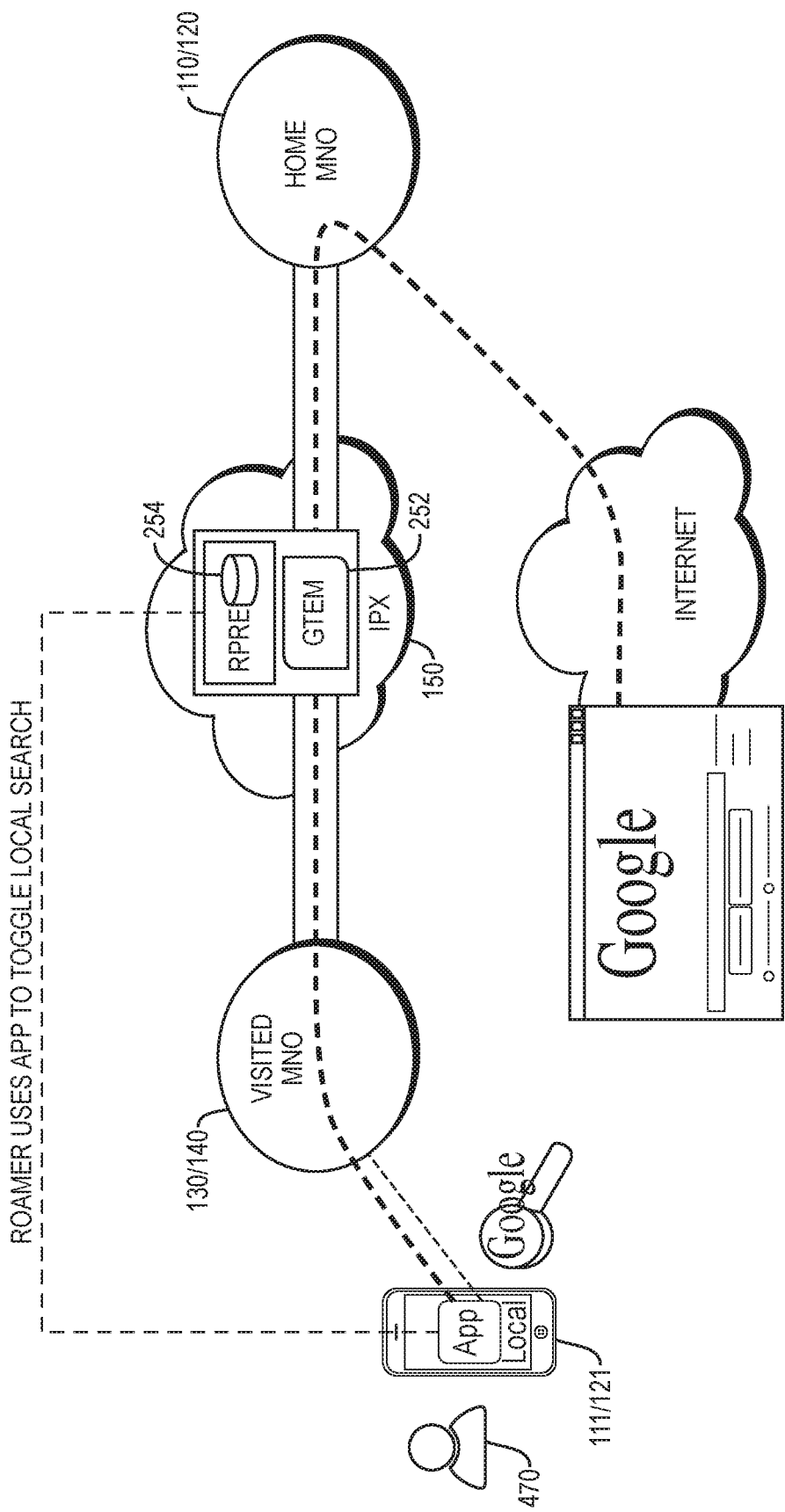
FIG. 6 is a block diagram of an embodiment enabling a mobile subscriber to select a website location preference to use while roaming.

FIG. 6 illustrates an example embodiment enabling a mobile subscriber 470 to select a website location preference to use while roaming. Typically in a home routed roaming architecture, although a mobile subscriber is roaming on visited network, the mobile subscriber (i.e., the mobile subscriber's mobile device) is assigned an IP address at the home communications network. Because the assigned IP address is assigned at the home network, the IP address indicates the location of the home network regardless of the actual location of the mobile subscriber (or the mobile subscriber's user network device) roaming on the visited network. This creates issues when the mobile subscriber browses a website that detects the location of the website user by means of the website user's IP address.

For example, if the mobile subscriber is roaming in Mexico and their home communication network is located in the United States, the mobile subscriber's IP address will be assigned in the United States. When the mobile subscriber uses a search engine while roaming in Mexico, the search results will be returned as if the mobile subscriber is located in the United States. This could be an issue if the mobile subscriber would benefit from the customized local search results the search engine would have returned if the search engine was aware the mobile subscriber was currently in Mexico, and not the United States. Example embodiments of the present disclosure address this issue by enabling the mobile subscriber to set and edit a location preference while roaming.

According to at least one example embodiment illustrated in FIG. 6, a user network device 111/121 subscribed to a home communications network 110/120 is roaming in a visited communications network 130/140. According to the at least one example embodiment, an interconnect network 150 communicatively couples the visited communications network 130/140 and the home communications network 110/120. According to some embodiments, the interconnect network 150 may contain a roaming policy rule engine (RPRE) 254 that includes a roaming policy database 255 configured to store an identifier associated with the user network device 111/121, and a roaming policy for the user network device 111/121.

According to another aspect of the example embodiment, the roaming policy database or a separate database stores an index of website addresses for one or more websites with a plurality of location dependent versions. In some embodiments, the roaming policy also indicates a user location preference associated with the user network device 111/121. In some embodiments, the roaming policy may indicate a particular country or region location preference, or alternatively indicate only a preference for the visited network location or the home network location. If the location preference is the home network, the location feature is deactivated, and the GTEM 252 will not modify the packets based on any location.

According to another aspect of the example embodiment, the GTEM 252 is configured to determine if a data request from the user network device 111/121 is requesting one of the websites from the index of website addresses, and if so, modify the data request based on the user location preference associated with the user network device 111/121.

According to some embodiments, the mobile subscriber may utilize a mobile application and/or web portal to toggle on and off location based browsing for a user network device 111/121 the mobile subscriber controls. The mobile application and/or web portal may edit the user network device's roaming policy in the RPRE 254 to indicate that location based web browsing is activated. The GTEM 252 may then begin monitoring the data requests from the user network device and determine if the user network device is requesting one of the websites from the stored index of websites that have location based versions.

For example, if the user network device's roaming policy indicates location based web browsing is activated, the GTEM 252 will modify any data requests of websites with location based versions so that the user network device 111/121 receives the preferred location version of the website as opposed to the version of the website for the location of the home network. The roaming policy may indicate the location preference is any given location or the location of the visited network where the user network device 111/121 is roaming.

In some embodiments, the GTEM 252 determines the location of the visited network by inspecting the data request from the user network device 111/121. The GTEM 252 may modify the data request to ensure the proper location version of the website is returned to the user network device 111/121. This can be accomplished any number of ways.

For a non-limiting example, the GTEM 252 may replace the requested URL with a different URL that specifically requests the preferred location version of the website. For instance, if a user network device 111/121 requests the URL www.google.com and the location preference is sent to Mexico and the home communication network is located in the United States, the GTEM 252 will modify the data request to request the URL www.google.com.mx instead. This will cause the Mexico version of the website to be returned.

Figure 7:
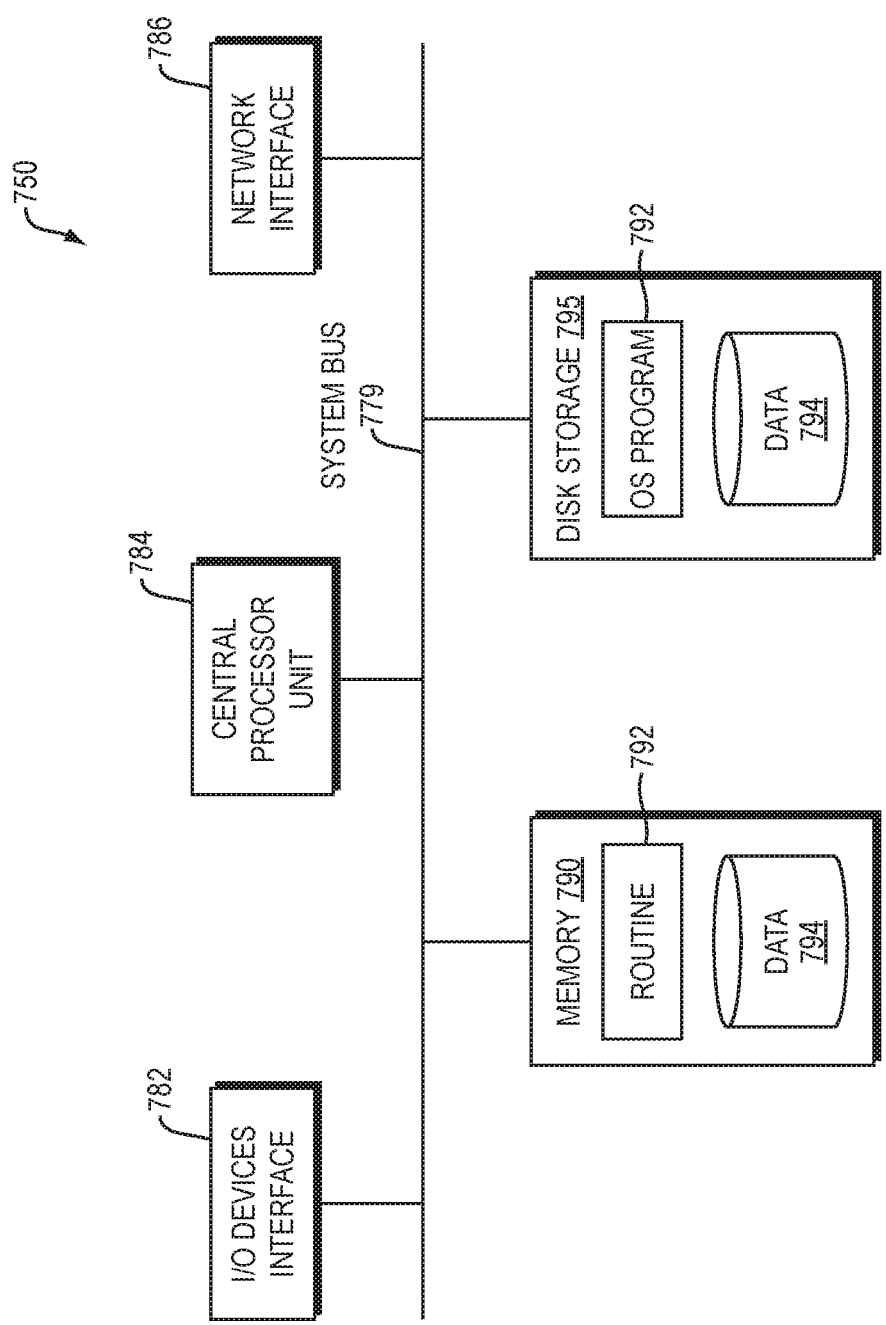
FIG. 7 is a block diagram of the internal structure of a computer in which various embodiments of the present disclosure may be implemented.

FIG. 7 is a block diagram of the internal structure of a computer 750 in which various embodiments of the present invention may be implemented. The computer 750 contains a system bus 779, where a bus is a set of hardware lines used for data transfer among the components of a computer or processing system. Bus 779 is essentially a shared conduit that connects different elements of a computer system (e.g., processor, disk storage, memory, input/output ports, network ports, etc.) that enables the transfer of information between the elements. Attached to system bus 779 is I/O device interface 982 for connecting various input and output devices (e.g., keyboard, mouse, displays, printers, speakers, etc.) to the computer 750. Network interface 786 allows the computer 750 to connect to various other devices attached to a network. Memory 790 provides volatile storage for computer software instructions 792 and data 794 used to implement an embodiment of the present disclosure. Disk storage 795 provides non-volatile storage for computer software instructions 792 and data 794 used to implement an embodiment of the present invention. Central processor unit 784 is also attached to system bus 779 and provides for the execution of computer instructions.

In one embodiment, the processor routines 792 and data 794 are a computer program product (generally referenced 792), including a computer readable medium (e.g., a removable storage medium such as one or more DVD-ROM's, CD-ROM's, diskettes, tapes, etc.) that provides at least a portion of the software instructions for the invention system. Computer program product 792 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 7 is for purposes of illustration and not limitation of the present invention.

While example embodiments have been particularly shown and described, it will be understood by those skilled in the art that various changes in form and details may be made therein without departing from the scope encompassed by the appended claims.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:
1. A system comprising:
an interconnect network communicatively coupling a visited mobile communications network and a home mobile communications network, the interconnect network including:
a roaming policy database configured to store an identifier associated with a user network device, the user network device roaming in the visited mobile communications network and subscribed to the home mobile communications network, and a roaming policy for the user network device, the roaming policy indicating a user location preference associated with the user network device; and
a traffic detection and enforcement module including a processor, the processor configured to:
identify a data request being sent from the user network device in the visited mobile communications network by reading the identifier in the data request,
deny or allow the data request based on the roaming policy, and
pass the data request unmodified if the user location preference is the home mobile communications network's location.

2. The system of claim 1, wherein to allow the data request based on the roaming policy includes any one of:
- accept the data request based on the roaming policy,
- divert the data request based on the roaming policy,
- rewrite the data request based on the roaming policy, and
- enrich the data request based on the roaming policy.

3. The system of claim 1, wherein to deny the data request based on the roaming policy includes any one of:
- reject the data request based on the roaming policy,
- drop the data request based on the roaming policy,
- inject the data request based on the roaming policy, and
- shunt the data request based on the roaming policy.

4. The system of claim 1, further comprising:
- a roaming policy portal configured to enable a mobile subscriber associated with the user network device to alter the roaming policy.

5. The system of claim 4, wherein the roaming policy further includes permissions allowing or denying access to one or more particular data services.

6. The system of claim 5, wherein the processor is further configured to:
- determine if the data request includes a request to access at least one particular data service of the one or more particular data services by inspecting the data request for a signature of the at least one particular data service and comparing the signature to known signatures for data services stored in a signature database, different particular data services having different signatures,
- determine if the permissions in the roaming policy allows or denies access to the at least one particular data service, and
- deny or allow the data request based on the permissions in the roaming policy associated with the at least one particular data service.

7. The system of claim 6, wherein the roaming policy further includes a user defined data limit for the at least one particular data service of the one or more particular data services and a record of data consumed by the at least one particular data service, and the processor is further configured to track an amount of data consumed by the at least one particular data service and update the record of data consumed with the tracked amount of data consumed by the at least one particular data service.

8. The system of claim 7, wherein the processor is further configured to deny access to the at least one particular data service upon the record of data consumed by the at least one particular data service reaching the user defined data limit for the at least one particular data service.

9. The system of claim 7, wherein the roaming policy portal is further configured to display the permissions allowing or denying access to the one or more particular data services, and the record of data consumed by the at least one particular data service.

10. The system of claim 5, wherein the one or more particular data services are particular applications or particular websites.

11. The system of claim 6, wherein the roaming policy further includes a data shaping profile with a bandwidth limit for at least one particular data service, and the processor is further configured to shape data consumed by the at least one particular data service based on the data shaping profile.

12. The system of claim 4, wherein the roaming policy portal is further configured to enable the mobile subscriber to alter a second roaming policy for a second user network device.

13. The system of claim 4, wherein the processor is further configured to monitor roaming data usage for the user network device.

14. The system of claim 1, wherein the roaming policy indicates roaming is deactivated for the user network device.

15. The system of claim 1, wherein the processor is further configured to deny the data request in the interconnect network before the data request reaches the home mobile communications network, resulting in prevention of a data bearer being established.

16. The system of claim 15, wherein the processor is further configured to insert an access-restriction-data attribute-value pair in the data request to prevent a data bearer from being established.

17. The system of claim 1, wherein the data request is a session create request.

18. A method comprising:
- receiving, at an interconnect network communicatively coupling a visited mobile communications network and a home mobile communications network, a data request sent from a user network device roaming in the visited mobile communications network, the user network device being subscribed to the home mobile communications network;
- storing, in a database of the interconnect network, a roaming policy for the user network device and an identifier associated with the user network device;
- associating, in the roaming policy, a user location preference with the user network device;
- identifying, at the interconnect network, the received data request sent from the user network device by reading the identifier associated with the user network device in the data request;
- enforcing the roaming policy, at the interconnect network, by denying or allowing the data request based on the roaming policy; and
- passing the data request unmodified if the user location preference is the home mobile communications network's location.

19. The method of claim 18, wherein allowing the data request based on the roaming policy includes any one of:
- accepting the data request based on the roaming policy,
- diverting the data request based on the roaming policy,
- rewriting the data request based on the roaming policy, and
- enriching the data request based on the roaming policy.

20. The method of claim 18, wherein denying the data request based on the roaming policy includes any one of:
- rejecting the data request based on the roaming policy,
- dropping the data request based on the roaming policy,
- injecting the data request based on the roaming policy, and
- shunting the data request based on the roaming policy.

21. The method of claim 18, further comprising monitoring roaming data usage for the user network device.

22. The method of claim 18, wherein the roaming policy indicates roaming is deactivated for the user network device.

23. The method of claim 18, wherein the roaming policy is enforced by denying the data request in the interconnect network before the data request reaches the home mobile communications network, resulting in prevention of a data bearer being established.

24. The method of claim 23, further comprising inserting an access-restriction-data attribute-value pair in the data request to prevent a data bearer from being established.

25. The method of claim 18, wherein the data request is a session create request.

26. The method of claim 18, further comprising accepting alterations to the roaming policy from a mobile subscriber associated with the user network device through a roaming policy portal.

27. The method of claim 26, wherein the roaming policy further includes permissions allowing or denying access to one or more particular data services.

28. The method of claim 27, further comprising determining if the data request includes a request to access at least one particular data service of the one or more particular data services by inspecting the data request for a signature of the at least one particular data service and comparing the signature to known signatures for data services stored in a signature database, different particular data services having different signatures, and determine if the permissions in the roaming policy indicate allowing or denying access to the at least one particular data service.

29. The method of claim 28, further comprising:
tracking an amount of data consumed by the at least one particular data service; and
updating a record of data consumed with the tracked amount of data consumed by the at least one particular data service;
wherein the roaming policy further includes a user defined data limit for the at least one particular data service of the one or more particular data services, and the record of data consumed by the at least one particular data service.

30. The method of claim 29, further comprising denying access to the at least one service upon the record of data consumed by the at least one particular data service reaching the user defined data limit for the at least particular data one service.

31. The method of claim 29, further comprising displaying the permissions allowing or denying access to the one or more particular data services, and the record of data consumed by the at least one particular data service.

32. The method of claim 28, further comprising shaping data consumed by the at least one service based on a data shaping profile, wherein the roaming policy further includes the data shaping profile with a bandwidth limit for at least one particular data service.

33. The method of claim 27, wherein the one or more particular data services are particular applications or particular websites.

34. The method of claim 26, further comprising enabling the mobile subscriber to alter a second roaming policy for a second user network device.

35. A system comprising:
an interconnect network communicatively coupling a visited mobile communications network and a home mobile communications network, the interconnect network including:
a roaming policy database configured to store an identifier associated with a user network device, the user network device roaming in the visited mobile communications network and subscribed to the home mobile communications network, and a roaming policy for the user network device, wherein the roaming policy database is further configured to store an index of website addresses for one or more websites with a plurality of location dependent versions and indicates a user location preference associated with the user network device; and
a traffic detection and enforcement module including a processor, the processor configured to:
identify a data request being sent from the user network device in the visited mobile communications network by reading the identifier in the data request;
deny or allow the data request based on the roaming policy;
determine if the data request is requesting one of the websites from the index of website addresses; and
modify the data request based on the user location preference associated with the user network device.

36. The system of claim 35, further comprising a roaming policy portal configured to enable a mobile subscriber associated with the user network device to alter the user location preference.

37. The system of claim 35, wherein the one or more websites with a plurality of location dependent versions include search features.

38. A method comprising:
receiving, at an interconnect network communicatively coupling a visited mobile communications network and a home mobile communications network, a data request sent from a user network device roaming in the visited mobile communications network, the user network device being subscribed to the home mobile communications network;
storing, in a database, a roaming policy for the user network device and an identifier associated with the user network device;
identifying the received data request sent from the user network device by reading the identifier associated with the user network device in the data request;
enforcing the roaming policy, at the interconnect network, by denying or allowing the data request based on the roaming policy;
storing, in the database, an index of website addresses for one or more websites with a plurality of location dependent versions;
associating, in the roaming policy, a user location preference with the user network device;
determining if the data request is requesting one of the websites from the index of website addresses; and
modifying the data request based on the user location preference associated with the user network device.

39. The method of claim 38, further comprising accepting a change to the user location preference from a mobile subscriber associated with the user network device through a roaming policy portal.

40. The method of claim 38, wherein the one or more websites with a plurality of location dependent versions include search features.

* * * * *